United States Patent
Abiru et al.

(10) Patent No.: US 7,354,373 B2
(45) Date of Patent: Apr. 8, 2008

(54) VEHICLE DRIVE UNIT, AND FOUR-WHEEL-DRIVE VEHICLE DRIVE UNIT

(75) Inventors: Yuji Abiru, Toyota (JP); Shinji Ogawa, Toyota (JP); Koji Naito, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 174 days.

(21) Appl. No.: 11/248,151

(22) Filed: Oct. 13, 2005

(65) Prior Publication Data

US 2006/0084548 A1    Apr. 20, 2006

(30) Foreign Application Priority Data

Oct. 20, 2004    (JP)    .............................. 2004-306174

(51) Int. Cl.
*F16H 37/08*    (2006.01)
*B60W 17/00*    (2006.01)
*B60W 17/06*    (2006.01)

(52) U.S. Cl. ...................... 475/201; 475/206; 180/344; 180/369

(58) Field of Classification Search ................ 475/201, 475/206; 180/245, 246, 248, 344, 368, 369
See application file for complete search history.

(56) References Cited

U.S. PATENT DOCUMENTS

| | | | |
|---|---|---|---|
| 4,805,713 A * | 2/1989 | Tsuneda | .................... 180/233 |
| 5,042,610 A * | 8/1991 | Shiraishi et al. | ............ 180/249 |
| 5,064,017 A * | 11/1991 | Kikuchi et al. | ............. 180/248 |
| 5,143,167 A | 9/1992 | Moriyama et al. | |
| 5,348,516 A | 9/1994 | Shibata et al. | |
| 6,041,877 A | 3/2000 | Yamada et al. | |
| 6,158,303 A * | 12/2000 | Shiraishi et al. | .......... 74/665 T |
| 6,523,633 B1 | 2/2003 | Teraoka et al. | |
| 6,729,991 B1 * | 5/2004 | Nishiji et al. | ................ 475/221 |

FOREIGN PATENT DOCUMENTS

| | | |
|---|---|---|
| DE | 30 44 712 A1 | 8/1981 |
| DE | 31 45 117 A1 | 5/1983 |
| EP | 0 192 324 A2 | 8/1986 |
| FR | 2 516 623 | 5/1983 |
| FR | 2 562 000 | 10/1985 |
| JP | 58-84246 | 5/1983 |
| JP | 62-43884 | 9/1987 |
| JP | 3-284427 | 12/1991 |
| JP | 2964532 | 8/1999 |

* cited by examiner

*Primary Examiner*—Tisha Lewis
(74) *Attorney, Agent, or Firm*—Oblon, Spivak, McClelland, Maier & Neustadt, P.C.

(57) ABSTRACT

A vehicle drive unit including (a) a transversely-mounted engine, (b) a transmission receiving an output of the engine and having an output shaft, and (c) a differential gear device including a ring gear and arranged to transmit an output of the transmission to a pair of right and left drive wheels while permitting a differential action, and wherein the differential gear device is located on one side of the engine which is on the side of the right and left drive wheels, and rotary power transmitting elements between an output gear fixedly mounted on the output shaft of the transmission and the ring gear of the differential gear device are arranged in a single row parallel to the longitudinal direction of vehicle, so that the vehicle drive unit has a relatively small axial dimension in the transverse or width direction B of the vehicle.

4 Claims, 5 Drawing Sheets

VEHICLE DRIVE UNIT, AND FOUR-WHEEL-DRIVE VEHICLE DRIVE UNIT

The present application is based on Japanese Patent Application No. 2004-306174 filed on Oct. 20, 2004, the contents of which are herein incorporated by reference.

BACKGROUND OF THE INVENTION

1. Field of the Invention

The present invention relates in general to a drive unit for a vehicle having a transversely-mounted engine or a four-wheel-drive vehicle, and more particularly to techniques for reducing an axial dimension of such a drive unit.

2. Discussion of Related Art

In one known type of vehicle, a differential gear device and a transfer device are disposed on one radial side of an input shaft of a transmission that is coaxial with a crankshaft of an engine, for example, on one of front and rear sides of the input shaft where the engine is transversely mounted. In this type of vehicle, the engine and a transaxle fixed to the engine are elastically supported by the body of the vehicle through engine mounts, but the weight distribution about the crankshaft is not uniform or even, so that the vehicle is relatively likely to generate vibration and noises, giving rise to a problem of deterioration of so-called "noise and vibration performance".

To solve this problem, JP-3-284427A proposes a four-wheel-drive vehicle drive unit in which a differential gear device is disposed on a front side of an engine, while a transfer device (power distributing mechanism) is disposed on a rear side of the engine, so that the weight distribution about the crankshaft is made even.

The conventional four-wheel-drive vehicle drive unit described above includes a first intermediate drive gear which receives a drive force for driving the differential gear device and which is fixed to the output shaft of a transmission. The drive unit further includes a transfer drive gear which receives a drive force for driving the transfer device and which is also fixed to the output shaft of the transmission such that the transfer drive gear and the first intermediate gear are parallel to each other. Accordingly, this drive unit has a first power transmitting path for driving the differential gear device and a second power transmitting path for driving the transfer device, which are operatively connected to the output shaft of the transmission, so that the drive unit has a relatively large size. In this respect, there has been a need of reducing the size of the drive unit. It is also noted that the input shaft and output shaft of the transmission are coaxial with the crankshaft in the above-described conventional four-wheel-drive drive unit. This means that the solution proposed by JP-3-284427A is not applicable to a drive unit including a manual transmission, typically of a parallel two-axes type, for example.

SUMMARY OF THE INVENTION

The present invention was made in the light of the background art discussed above. It is therefore an object of the present invention to provide a vehicle drive unit which comprises a transversely-mounted engine, a transmission receiving an output of the engine, and a differential gear device arranged to transmit an output of the transmission to a pair of right and left drive wheels while permitting a differential action, and which is small-sized with a reduced axial dimension.

The object indicated above may be achieved according to any one of the following modes of the present invention, each of which is numbered and depends from the other mode or modes, where appropriate, to indicate and clarify possible combinations of elements or technical features. It is to be understood that the present invention is not limited to the technical features or any combination thereof which will be described for illustrative purposes only.

(1) A drive unit for a vehicle, comprising (a) a transversely-mounted engine, (b) a transmission receiving an output of the engine and including an output shaft, and (c) a differential gear device including a ring gear and arranged to transmit an output of the transmission to a pair of right and left drive wheels while permitting a differential action, and wherein the differential gear device is located on one side of the engine which is on the side of the pair of right and left drive wheels, the drive unit being characterized in that rotary power transmitting elements between an output gear fixedly mounted on the output shaft of the transmission and the ring gear of the differential gear device are arranged or disposed in a single row parallel to a longitudinal direction of the vehicle.

The vehicle drive unit according to the above-described mode (1) of this invention has a relatively small axial dimension in the transverse or width direction of the vehicle, owing to the arrangement of the above-described rotary power transmitting elements between the output gear of the transmission and the ring gear of the differential gear device in one row parallel to the longitudinal direction of the vehicle.

(2) The drive unit according to the above-described mode (1), wherein the output gear of the transmission directly meshes with the ring gear of the differential gear device.

In the present vehicle drive unit according to the above-described mode (2), the output gear of the transmission directly meshes with the ring gear of the differential gear device. In other words, the vehicle drive unit does not require an intermediate gear for driving the differential gear device, and an intermediate shaft on which the intermediate gear is fixedly mounted. Accordingly, the vehicle drive unit has a relatively small number of components, and can be accordingly small-sized.

(3) A drive unit for a four-wheel-drive vehicle, comprising (a) a transversely-mounted engine, (b) a transmission receiving an output of the engine, (c) a differential gear device including a ring gear and arranged to transmit an output of the transmission to a first pair of right and left drive wheels while permitting a differential action, and (d) a power distributing mechanism arranged to transmit an output of the transmission to a second pair of right and left drive wheels through an output shaft extending in a longitudinal direction of the vehicle, and wherein transmission is located between the differential gear device and the power distributing mechanism, the drive unit being characterized in that rotary power transmitting elements between the ring gear of the differential gear device and a transfer drive gear for transmitting the output of the transmission to the power distributing mechanism are arranged or disposed in a single row parallel to the longitudinal direction of the vehicle.

The vehicle drive unit according to the above-described mode (3) of this invention has a relatively small axial dimension in the transverse or width direction of the vehicle, since the above-described rotary power transmitting elements between the ring gear pf the differential gear device and the transfer drive gear for transmitting the output of the transmission to the power distributing mechanism are arranged or disposed in one row parallel to the longitudinal direction of the vehicle.

(4) The drive unit according to the above-described mode (3), wherein the ring gear of the differential gear device, the transfer drive gear connected to the power distributing mechanism, and an output gear fixedly mounted on an output shaft of the transmission are arranged or disposed in a single row parallel to said longitudinal direction (A).

In the vehicle drive unit according to the above-described mode (4) wherein the ring gear, the transfer drive gear, and the output gear of the transmission are arranged in a single row parallel to the longitudinal direction, the axial dimension of the present drive unit can be further reduced.

(5) The drive unit according to the above-described mode (4), wherein the output gear of the transmission directly meshes with the ring gear of the differential gear device, and is connected to the transfer drive gear through an intermediate gear.

In the vehicle drive unit according to the above-described mode (5) wherein the output gear of the transmission directly meshes with the ring gear of the differential gear device, the vehicle drive unit does not require an intermediate gear for driving the differential gear device, and an intermediate shaft on which the intermediate gear is fixedly mounted. Accordingly, the vehicle drive unit has a relatively small number of components, and can be accordingly small-sized.

(6) The drive unit according to the above-described mode (4), wherein the output gear of the transmission is connected to the transfer drive gear through an intermediate gear, and the transfer drive gear is connected to the power distributing mechanism through a transfer drive shaft.

In the vehicle drive unit according to the above-described mode (6) wherein the output gear of the transmission is connected to the transfer drive gear through the intermediate gear, while the transfer drive gear is connected to the power distributing mechanism through the transfer drive shaft, the power distributing mechanism can be located at a desired position in the axial direction of the transfer drive shaft, irrespective of the position of the output gear of the transmission in its axial direction. Accordingly, the freedom of design of a drive system including the drive unit and a propeller shaft can be improved, particularly in the relative positions of the components of the drive system.

(7) The drive unit according to the above-described mode (4), wherein the output gear of the transmission directly meshes with the ring gear of the differential mechanism, and is connected to the transfer drive gear through the ring gear and an intermediate gear.

(8) The drive unit according to the above-described mode (4), wherein the output gear of the transmission is connected to the transfer drive gear through the ring gear and an intermediate gear, and the transfer drive gear is connected to the power distributing mechanism through a transfer drive shaft.

The vehicle drive unit according to the above-described mode (1) wherein the rotary power transmitting elements between the output of the transmission and the ring gear of the differential gear device is applicable to not only a four-wheel-drive vehicle but also to a two-wheel drive vehicle, as long as the differential gear device is located on one side of the engine which is on the side of a pair of right and left drive wheels. For example, the vehicle drive unit in question is applicable to: a front-engine front-drive (FF) vehicle wherein the engine is disposed in a front portion of the vehicle body; a rear-engine rear-drive (RR) vehicle wherein the engine is disposed in a rear portion of the vehicle body; a midship-engine rear-drive (MR) vehicle wherein the engine is disposed in an intermediate portion of the vehicle body. In the drive unit of the invention for these types of vehicle, the differential gear device must be located on one side of the engine which is on the side of a pair of right and left wheels, namely, in a front or rear end portion of the vehicle body. For example, the differential gear device is located in front of the engine in the FF vehicle, or located behind the engine in the RR vehicle. The pair of right and left wheels described with respect to the above-described mode (1) are interpreted to mean a pair of main drive wheels, or a pair of drive wheels driven by the differential gear device of the drive unit which includes a transaxle.

The engine may be an internal combustion engine such as a gasoline engine and a diesel engine. The transmission may be a manual transmission manually shiftable by the operator of the vehicle, or an automatic transmission of a step-variable planetary gear type or a continuously variable belt-and-pulley type, for example.

The rotary power transmitting elements described above include mechanical elements for power transmission between rotary shafts, such as gears, and power transmitting chains and belts. According to the invention, the rotary power transmitting elements described above must be arranged or disposed in one row parallel to the longitudinal direction of the vehicle, namely, along a straight line perpendicular to the axes of rotation of the rotary power transmitting elements, more precisely, arranged in a single straight row in a vertical plane parallel to the longitudinal direction.

The rotary power transmitting elements between the output gear fixedly mounted on the output shaft of the transmission and the ring gear of the differential gear device, in the drive unit according to the above-described mode (1), may consist of the output gear and the ring gear, where the output gear directly meshes with the ring gear. Where the output gear and the ring gear are operatively connected to each other through an intermediate gear, chain or belt, the rotary power transmitting elements include such an intermediate gear, chain or belt, as well as the output gear and the ring gear.

The rotary power transmitting elements between the ring gear of the differential gear device and the transfer drive gear for transmitting the output of the transmission to the power distributing mechanism, in the drive unit according to the above-described mode (3), include not only the ring gear and the transfer drive gear, but also any rotary elements interposed between the ring gear and the transfer drive gear, typically the output gear of the transmission and an intermediate gear, and may further include a power transmitting chain or belt described above.

BRIEF DESCRIPTION OF THE DRAWINGS

The above and other objects, features, advantages and technical and industrial significance of the present invention will be better understood by reading the following detailed description of preferred embodiments of this invention, when considered in connection with the accompanying drawings, in which.

DETAILED DESCRIPTION OF THE PREFERRED EMBODIMENTS

Figure 1:
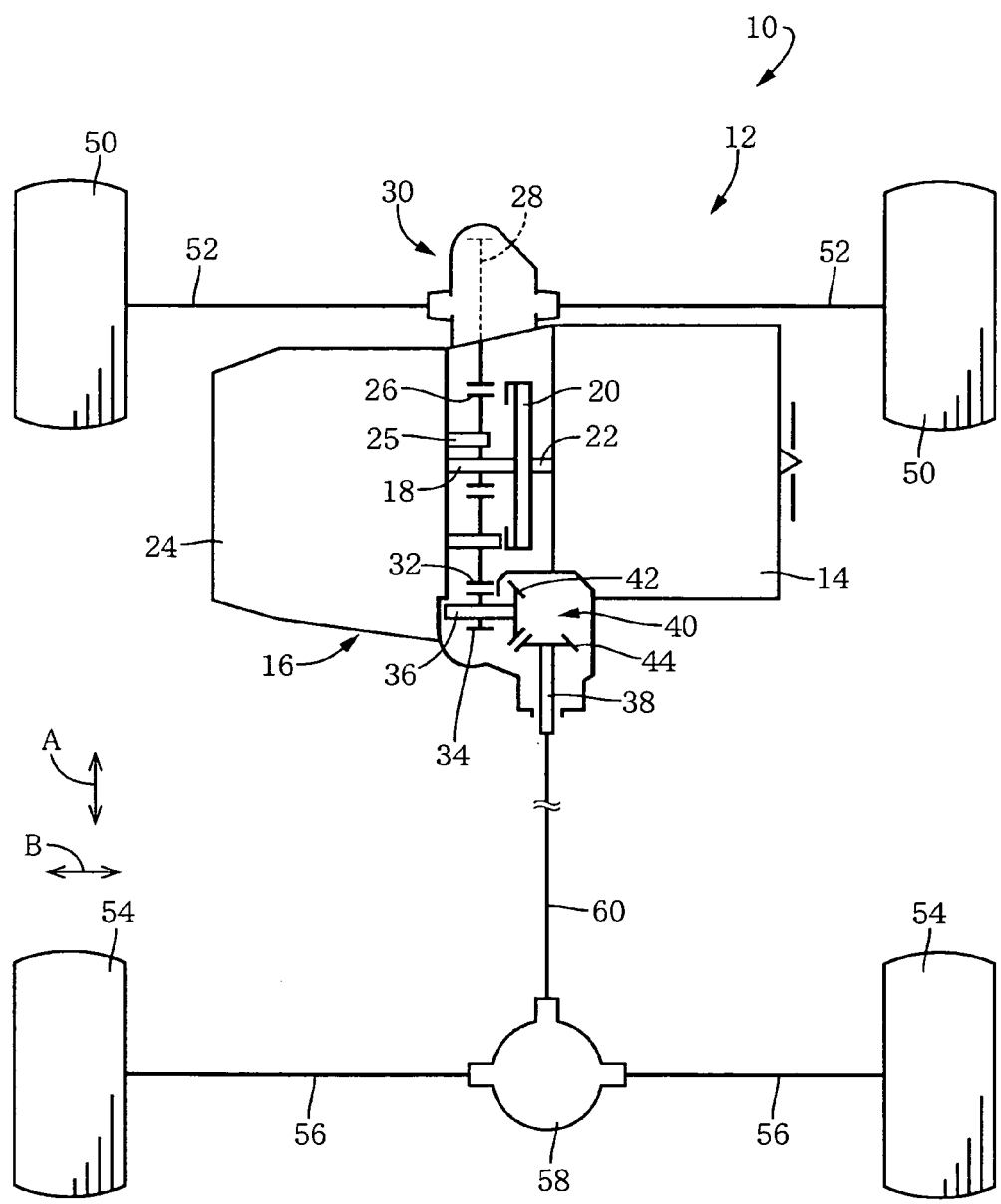
FIG. 1 is a plan view schematically showing a four-wheel-drive vehicle including a drive unit constructed according to one embodiment of the present invention.

Referring first to the plan view of FIG. 1, there will be described a drive unit 12 as installed on a four-wheel-drive vehicle 10, which drive unit 12 is constructed according to a first embodiment of this invention. The drive unit 12 includes a transversely-mounted engine 14 mounted on the vehicle 10 such that the axial direction (longitudinal direction) of the engine 14 is parallel to the transverse or width direction B (direction indicated by arrow-headed line B) of the vehicle 10. The drive unit 12 further includes a transaxle 16 integrally fixed to an end face of the engine 14. This transaxle 16 includes: a transmission 24 having an input shaft 18 connected to a crankshaft 22 of the engine 14 through a clutch 20; a differential gear device 30 having a ring gear 28 of a large diameter which meshes with an output gear 26 fixedly mounted on an output shaft 25 of the transmission 24; a transfer drive gear 34 which is fixedly mounted on one axial end portion of a transfer drive shaft 36 and which receives a drive force from the output gear 26 through an intermediate gear 32; and a power distributing mechanism (transfer device) 40 arranged to convert a rotary motion of the transfer drive shaft 36 into a rotary motion of a rear output shaft 38 which has an axis parallel to a longitudinal direction A (direction indicated by arrow-headed line A) of the vehicle 10.

The crankshaft 22, the clutch 20 and the input shaft 18 are coaxial with each other. The power distributing mechanism 40 includes a pair of bevel gears 42, 44 having mutually meshing hypoid gears, which are respectively fixed to the other axial end portion of the transfer drive shaft 36 and one axial end portion of the rear output shaft 38.

The four-wheel-drive vehicle 10 has a pair of front right and left drive wheels 50, 50 connected through respective two front axles 52, 52 to the differential gear device 30, and a pair of rear right and left drive wheels 54, 54 connected to the power distributing mechanism 40 through a pair of axles 56, a rear differential gear device 58 and a propeller shaft 60. In the present drive unit 12 constructed as described above, a rotary motion of the crankshaft 22 of the engine 14 is transmitted to the pair of front drive wheels 50, 50 through the clutch 20, transmission 24, differential gear device 30 and pair of front axles 52, 52, and to the pair of rear drive wheels 54, 54 through the clutch 20, transmission 24, power distributing mechanism 40, propeller shaft 60, rear differential gear device 58 and pair of rear axles 56, 56.

Figure 2:
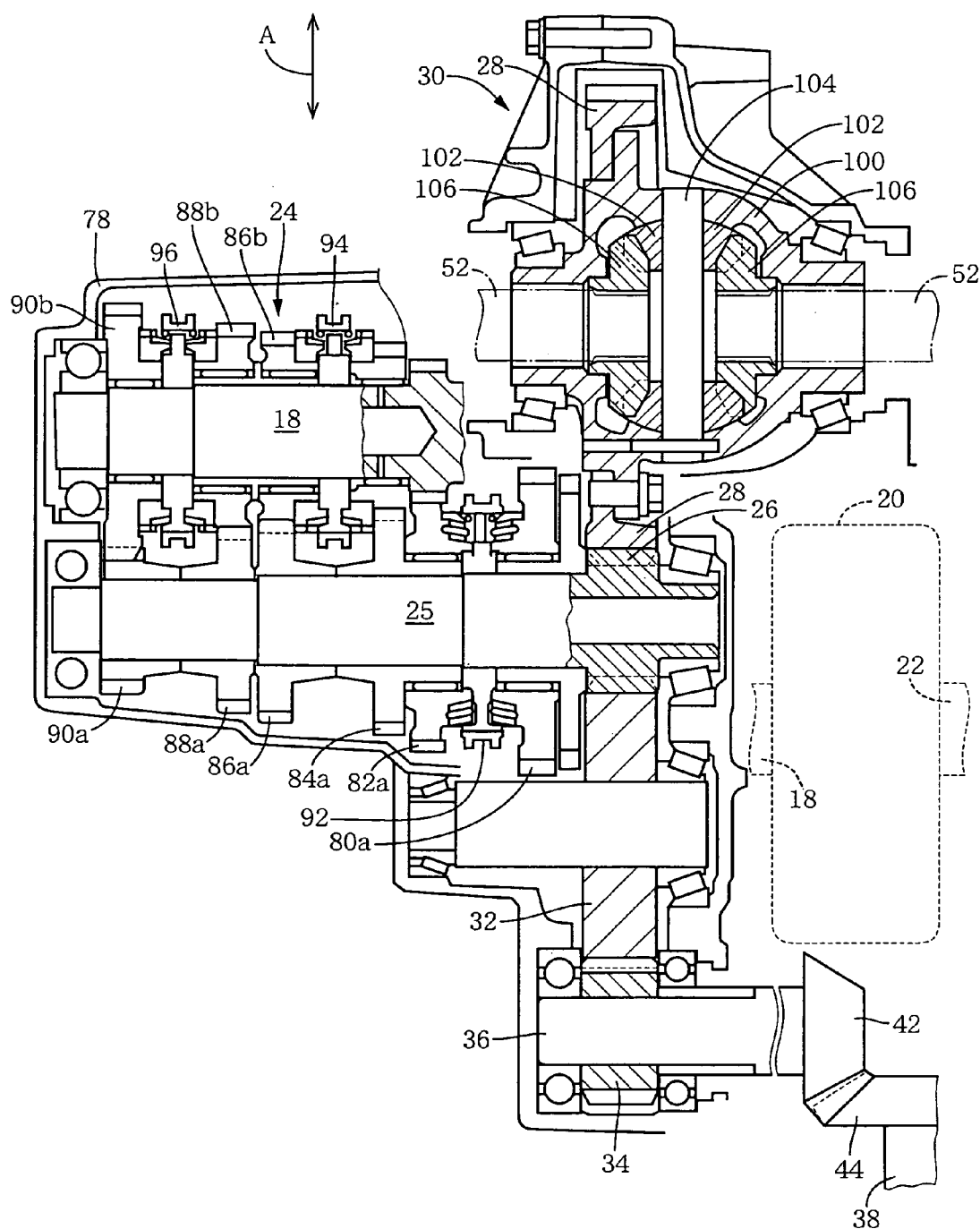
FIG. 2 is a fragmentary cross sectional view showing in enlargement the vehicle drive unit of FIG. 1.
Figure 3:
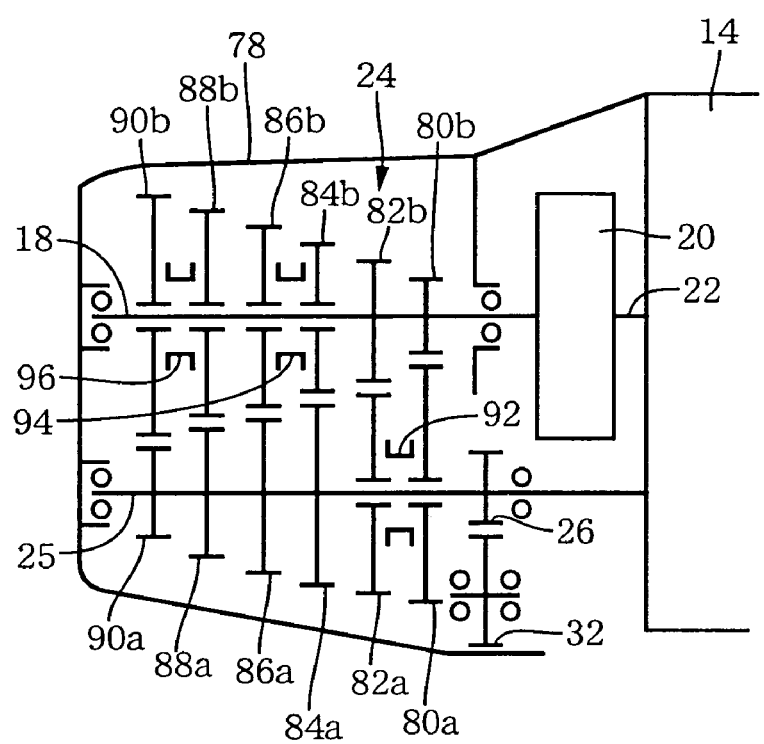
FIG. 3 is a view showing an arrangement of gears in a transmission of the vehicle drive unit of FIG. 2.

Referring next to the fragmentary enlarged cross sectional view of FIG. 2, there is the transaxle 16 of the drive unit 12. The plane of the cross sectional view of FIG. 2 includes axes of the various rotary elements. The transmission 24 is shown in cross section taken in a substantially vertical plane, and the engine 14 is shown in cross section taken in a substantially horizontal plane, in relative position with respect to the transmission 24. The vertical direction as seen in FIG. 2 is the longitudinal direction A of the vehicle 10, while the horizontal direction (right-left direction) is the transverse direction B of the vehicle 10. FIG. 3 schematically shows an arrangement of the transmission 24 substantially in the vertical cross section of the transaxle 16.

In the present embodiment, the transmission 24 is a manual transmission of a parallel two-axes, constant-meshing synchronous gear type well known in the art. The transmission 14 has the input shaft 18 and output shaft 25, which are rotatably supported by a housing 78 and parallel to each other. As shown in detail in FIG. 3, these input and output shafts 18, 25 carry six pairs of mutually engaging gears which have respective different gear ratios (ratios of the numbers of teeth of the two gears). The six pairs consist of a first pair of gears 80a, 80b, a second pair of gears 82a, 82b, a third pair of gears 84a, 84b, a fourth pair of gears 86a, 86b, a fifth pair of gears 88a, 88b, and a sixth pair of gears 90a, 90b. The input and output shafts 18, 25 are operatively connected to each other through of the six pairs of gears 80-90 which is selected by operation of one of three synchronizing devices 92, 94, 96, so that the rotary motion of the input shaft 18 is transmitted to the output shaft 25, at one of six different speed ratios $\gamma$ which corresponds to the selected one of the six different gear ratios of the six pairs of gears 80-90. The speed ratio $\gamma$ is equal to the rotating speed of the input shaft 18 divided by the rotating speed of the output shaft 25.

Like a differential gear device well known in the art, the differential gear device 30 includes a rotary body 100 in the form of a hollow housing which is rotated with the ring gear 28 about a first axis. The rotary body 100 supports a pin 104 extending in a direction perpendicular to the first axis, and accommodates a pair of pinions 102 supported by the pin 104 rotatably about a second axis perpendicular to the first axis. The rotary body 100 also accommodates a pair of side gears 106 such that the side gears 106 are rotatable about the first axis. These side gears 106 mesh with the pair of pinions 102, and are splined to the corresponding end portions of the pair of front axles 52.

Figure 4:
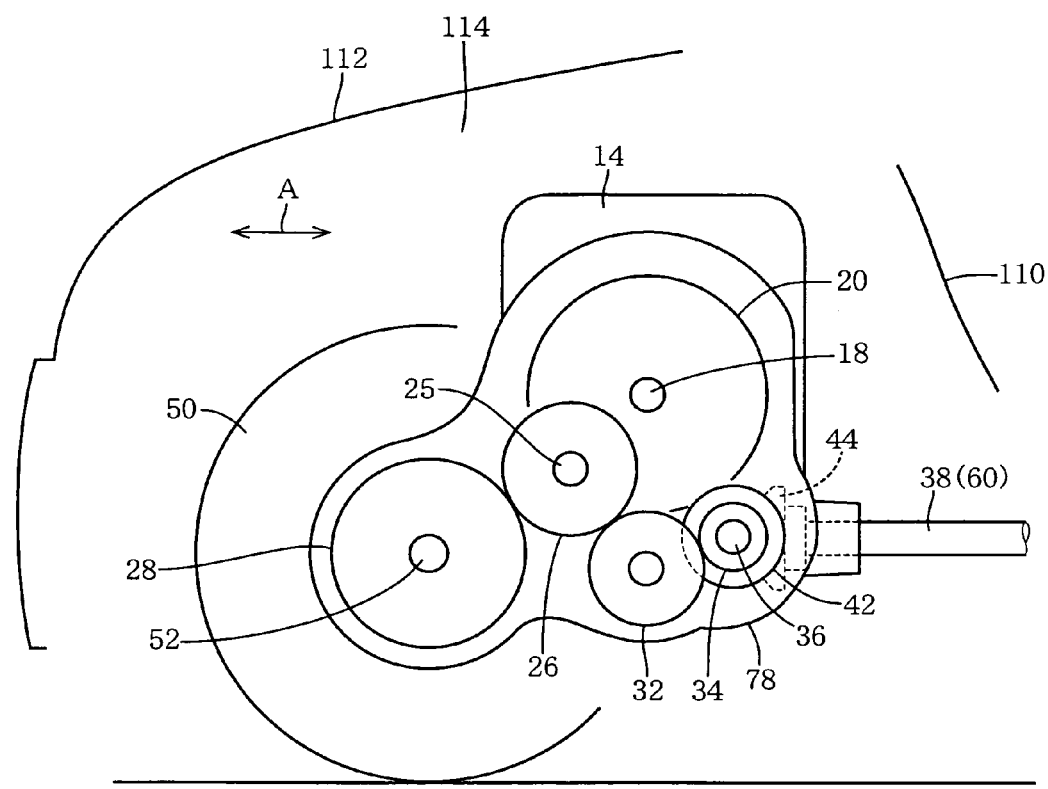
FIG. 4 is a fragmentary side elevational view of the four-wheel-drive vehicle, schematically indicating relative positions of rotary elements and gears of the drive unit in a vertical plane parallel to a longitudinal direction of the vehicle.

Referring to the fragmentary side elevational view of FIG. 4, there are indicated the relative positions of the rotary elements and gears of the engine 14 and transmission 24 of the drive unit 12 installed on the vehicle 10, as seen a vertical plane parallel to the longitudinal direction A of the vehicle. As shown in FIG. 4, the drive unit 12 including the engine 14 and the transaxle 16 fixed to the engine 14 is accommodated within an engine room or compartment 114 defined by a dash panel 110, a front hood 112 and a pair of front fenders (now shown) of the vehicle 10.

In the drive unit 12 according to the present embodiment of the invention constructed as shown in FIGS. 1-4, the differential gear device 30 is located on one side of the engine 14 and transmission 24 which is on the side of the front drive wheels 50 (serving as main drive wheels), as seen in the longitudinal direction A of the vehicle 10, as shown in FIGS. 1 and 4. In other words, the engine 14 and the transmission 24 are located between the differential gear device 30 and the power distributing mechanism 40 in the longitudinal direction A. The axes of the ring gear 28, output gear 25, intermediate gear 32 and transfer drive gear 34 are located in this order of description in the longitudinal direction A, from the front side toward the rear side of the vehicle 10. The axis of the ring gear 28 and the axis of the transfer drive gear 34 are located between the axis of the output gear 26 and the axis of the intermediate gear 32, in the vertical direction. Although the ring gear 28 has a larger diameter than the intermediate gear 32, the lowermost position of the outer circumference of the ring gear 28 is almost the same as that of the intermediate gear 32 whose axis is located at the lowest of the axes of the gears 26, 28, 32, 34.

As shown in FIGS. 1-4, the axes of the crankshaft 22, input shaft 18, output gear 26 (fixed to the output shaft 25), ring gear 28 (of the differential gear device 30), intermediate gear 32 and transfer drive gear 34 (fixed to the transfer drive shaft 36) are all parallel to the transverse direction B of the vehicle 10. Further, the ring gear 28, the output gear 26 meshing with the ring gear 28, the intermediate gear 32 meshing with the output gear 26, and the transfer drive gear 34 meshing with the intermediate gear 32 are arranged along a single straight line parallel to the longitudinal direction A, more precisely, arranged in a single straight row in a vertical plane parallel to the longitudinal direction A, as shown in FIGS. 1 and 2.

According to the present embodiment, the vehicle drive unit 12 includes the transversely-mounted engine 14, the transmission 24 receiving the output of the engine 14, and the differential gear device 30 arranged to transmit the output of the transmission to the pair of front right and left drive wheels 50 while permitting a differential action. In this vehicle drive unit 12, the differential gear device 30 is located on one side of the engine 14 which is on the side of the front right and left drive wheels, and the rotary power transmitting elements between the output gear 26 fixedly mounted on the output shaft 26 of the transmission 24 and the ring gear 28 of the differential gear device 30 are arranged or disposed in a single row parallel to the longitudinal direction A of vehicle 10, so that the vehicle drive unit 12 has a relatively small axial dimension in the transverse or width direction B of the vehicle 10. Further, the differential gear device 30 is located on one side of the engine 14 which is on the side of the front drive wheels 50, so that the present drive unit 12 has a smaller overall height dimension than a vehicle drive unit in which the differential mechanism is located below the transmission. Accordingly, the present vehicle drive unit 12 can be easily accommodated within a space available in the engine room 114.

In the present vehicle drive unit 12, the output gear 26 of the transmission 24 directly meshes with the ring gear 28 of the differential gear device 30. In other words, the vehicle drive unit 12 does not require an intermediate gear for driving the differential gear device 30, and an intermediate shaft on which the intermediate gear is fixedly mounted. Accordingly, the vehicle drive unit 12 has a relatively small number of components, and can be accordingly small-sized.

According to the present embodiment, the drive unit 12 for the four-wheel-drive vehicle 10 includes the transversely-mounted engine 14, the transmission 24 receiving the output of the engine 14, the differential gear device 30 arranged to transmit the output of the transmission to the front right and left drive wheels 50 while permitting a differential action, and the power distributing mechanism 40 arranged to transmit the output of the transmission to the rear right and left drive wheels 54 through the rear output shaft 38 extending in the longitudinal direction A of the vehicle 10. In the vehicle drive unit 12, the transmission 24 is located between the differential gear device 30 and the power distributing mechanism 40, and rotary power transmitting elements between the ring gear 28 of the differential gear device 30 and the transfer drive gear 34 for transmitting the output of the transmission 24 to the power distributing mechanism 40 are arranged or disposed in a single row parallel to the longitudinal direction A of the vehicle 10, so that the vehicle drive unit 12 has a relatively small axial dimension in the transverse or width direction B of the vehicle 10. Further, the differential gear device 30 is located on one side of the engine 14 which is on the side of the front drive wheels 50, so that the present drive unit 12 has a smaller overall height dimension than a vehicle drive unit in which the differential mechanism is located below the transmission. Accordingly, the present vehicle drive unit 12 can be easily accommodated within a space available in the engine room 114.

According to the present embodiment, the ring gear 28 of the differential gear device 30, the transfer drive gear 34 connected to the power distributing mechanism 40, and the output gear 26 fixedly mounted on the output shaft 25 of the transmission 24 are arranged in a single row parallel to the longitudinal direction A of the four-wheel-drive vehicle 10, so that the axial dimension of the present drive unit 12 can be further reduced.

In the present embodiment, the output gear 26 of the transmission 24 is connected to the transfer drive gear 34 through the intermediate gear 32, and the transfer drive gear 34 is connected to the input-side bevel gear 42 of the power distributing mechanism 40 through the transfer drive shaft 36. In this arrangement, the power distributing mechanism 40 can be located at a desired position in the axial direction of the transfer drive shaft 36 (input-side bevel gear 42), irrespective of the position of the output gear 26 in its axial direction.

Figure 5:
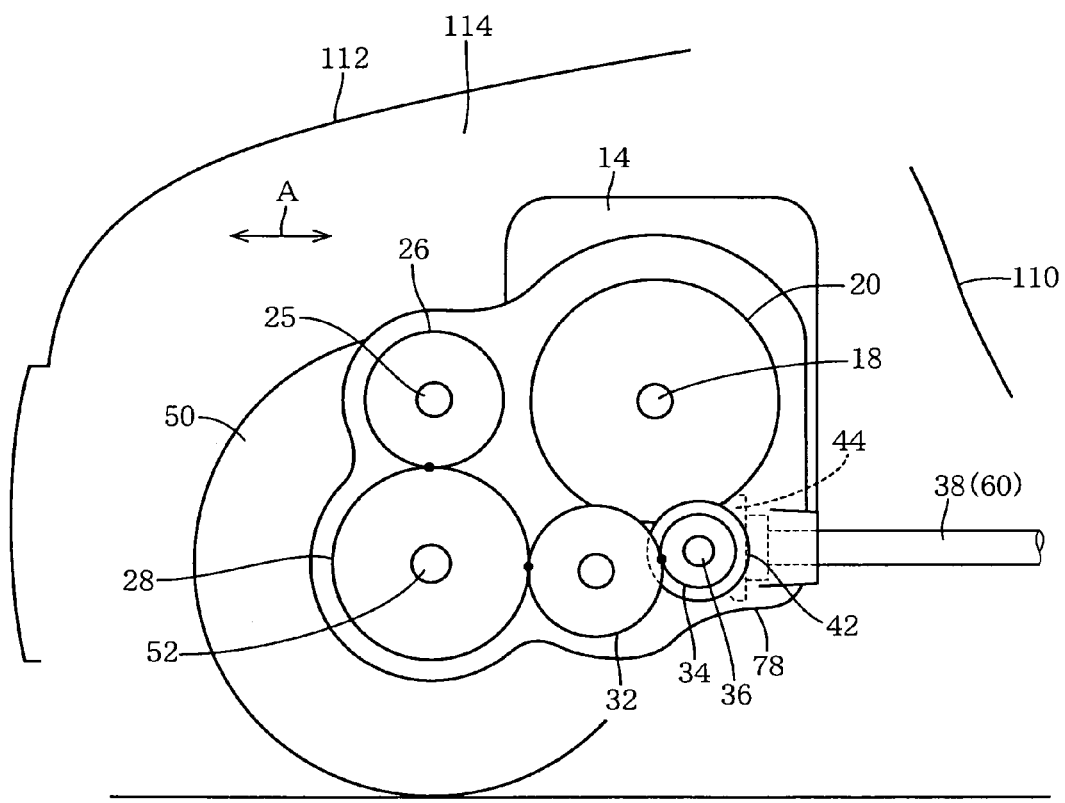
FIG. 5 is a fragmentary side elevational view corresponding to that of FIG. 4, schematically indicating relative positions of rotary elements and gears of a four-wheel-drive vehicle drive unit according to another embodiment of this invention.

Referring next to the fragmentary side elevational view of FIG. 5 corresponding to that of FIG. 4, there is schematically shown a four-wheel-drive vehicle provided with a drive unit constructed according to another embodiment of the present invention. The transmission 24 used in the present drive unit may be a continuously variable transmission (CVT) of a belt-and-pulley type. The output shaft 25 of the transmission 24 is located above the axis of rotation (front axles 52) of the differential gear device 30, and in front of the input shaft 18 of the transmission 24 (crankshaft 22 of the engine 14). The intermediate gear 32 is operatively connected to the output gear 26 through the ring gear 28 of the differential gear device 30, so that the output of the transmission 24 is transmitted to the input-side bevel gear 42 of the power distributing mechanism 40 through the output gear 26, ring-gear 28, intermediate gear 32, transfer drive gear 34 and transfer drive shaft 36. In this embodiment, too, the ring gear 28 of the differential gear device 30, the transfer drive gear 34 for transmitting the output of the transmission 24 to the power distributing mechanism 40, and the output gear 26 fixedly mounted on the output shaft 25 of the transmission 24 are arranged or disposed in a single row parallel to the longitudinal direction A of the vehicle, so that the drive unit according to this second embodiment has substantially the same advantages as described above with respect to the first embodiment of FIGS. 1-4.

The vehicle drive units according to the first embodiment of FIG. 4 and the second embodiments of FIG. 5 may be modified so as to eliminate the transfer drive gear 34 and the transfer drive shaft 36, and to connect the input-side bevel gear 42 of the power distributing mechanism 40 to the shaft of the intermediate gear 32. This modified embodiment may be considered as an embodiment in which the intermediate gear 32 is eliminated, and the transfer drive gear 34 directly meshes with the output gear 26 or the ring gear 28. In this modification wherein the intermediate gear 32 is eliminated, the required number of components of the drive unit can be further reduced. In a further modification, the ring gear 28 meshes with a first counter gear which is operatively connected to the transfer drive gear 34 through second and third counter gears.

While the preferred embodiments of this invention have been described in detail by reference to the accompanying drawings, for illustrative purpose only, it is to be understood that the present invention is not limited to the details of the preferred embodiments, but may be embodied with various changes, modifications and improvements which may occur to those skilled in the art, in the light of the foregoing teachings.

What is claimed is:

1. A drive unit for a four-wheel-drive vehicle, comprising:
    (a) a transversely-mounted engine,
    (b) a transmission that receives an output of the engine,
    (c) a differential gear device that includes a ring gear and that is arranged to transmit an output of the transmission to a first pair of right and left drive wheels while permitting a differential action, and
    (d) a power distributing mechanism arranged to transmit an output of the transmission to a second pair of right and left drive wheels through an output shaft extending in a longitudinal direction of the vehicle,
    wherein said transmission is located between said differential gear device and said power distributing mechanism,
    wherein an axis of rotation of the ring gear of the differential gear device is located in front of an axis of rotation of an output gear in the longitudinal direction of the vehicle, the output gear being attached to an output shaft of the transmission and the ring gear being directly meshed with the output gear,
    wherein an axis of rotation of a transfer drive gear that transmits power from the ring gear to the power distributing mechanism is located rearward of the output gear in the longitudinal direction of the vehicle, the transfer gear being meshed with the output gear via an intermediate gear that includes an axis of rotation that is parallel to an axis of rotation of the output gear, and
    wherein the ring gear, the output gear, the intermediate gear, and the transfer drive gear are arranged in a single row parallel to the longitudinal direction of the vehicle.

2. The drive unit according to claim 1, wherein said transfer drive gear is connected to said power distributing mechanism through a transfer drive shaft.

3. A drive unit for a four-wheel-drive vehicle, comprising:
    (a) a transversely-mounted engine,
    (b) a transmission that receives an output of the engine,
    (c) a differential gear device that includes a ring gear and that is arranged to transmit an output of the transmission to a first pair of right and left drive wheels while permitting a differential action, and
    (d) a power distributing mechanism arranged to transmit an output of the transmission to a second pair of right and left drive wheels through an output shaft extending in a longitudinal direction of the vehicle,
    wherein said transmission is located between said differential gear device and said power distributing mechanism,
    wherein an axis of rotation of the ring gear of the differential gear device is not collinear with an axis of rotation of an output gear in the longitudinal direction of the vehicle, the output gear being attached to an output shaft of the transmission,
    wherein an axis of rotation of a transfer drive gear that transmits power from the ring gear to the power distributing mechanism is located rearward of the output gear in the longitudinal direction of the vehicle,
    wherein said output gear of said transmission directly meshes with said ring gear of said differential gear device, and said output gear is connected to said transfer drive gear through said ring gear and an intermediate gear, and
    wherein the ring gear, the output gear, the intermediate gear, and the transfer drive gear are arranged in a single row parallel to the longitudinal direction of the vehicle.

4. The drive unit according to claim 3, wherein said transfer drive gear is connected to said power distributing mechanism through a transfer drive shaft.

* * * * *